(12) United States Patent
Yeom

(10) Patent No.: US 7,904,950 B2
(45) Date of Patent: Mar. 8, 2011

(54) DYNAMIC NETWORK SECURITY

(75) Inventor: Eung-Moon Yeom, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1052 days.

(21) Appl. No.: 11/413,094

(22) Filed: Apr. 28, 2006

(65) Prior Publication Data

US 2006/0265741 A1   Nov. 23, 2006

(30) Foreign Application Priority Data

May 17, 2005   (KR) ...................... 10-2005-0041332

(51) Int. Cl.
*G06F 9/00* (2006.01)
(52) U.S. Cl. ................ 726/11; 726/3; 726/12
(58) Field of Classification Search ........................ None
See application file for complete search history.

(56) References Cited

U.S. PATENT DOCUMENTS

| | | | |
|---|---|---|---|
| 7,047,561 B1 * | 5/2006 | Lee | 726/12 |
| 7,315,537 B2 * | 1/2008 | Klaghofer et al. | 370/352 |
| 7,406,709 B2 * | 7/2008 | Maher et al. | 726/12 |
| 2003/0028806 A1 | 2/2003 | Govindarajan | |

FOREIGN PATENT DOCUMENTS

| | | |
|---|---|---|
| WO | WO 02/19644 | 3/2002 |
| WO | WO 2005/117327 | 12/2005 |
| WO | WO 2005/120008 | 12/2005 |

OTHER PUBLICATIONS

Search and Examination Report for UK Patent Application No. GB0609098.9 dated Jul. 27, 2006.

* cited by examiner

*Primary Examiner* — Pramila Parthasarathy
(74) *Attorney, Agent, or Firm* — H.C. Park & Associates, PLC

(57) ABSTRACT

In a dynamic network security system and method for networks using a firewall, in judging whether packets using unfixed IPs and ports, such as VoIP (Voice over Internet Protocol) packets, are to be passed or blocked by a firewall, a current communication condition is reflected, thereby enhancing QoS (Quality of Service) of networks.

15 Claims, 4 Drawing Sheets

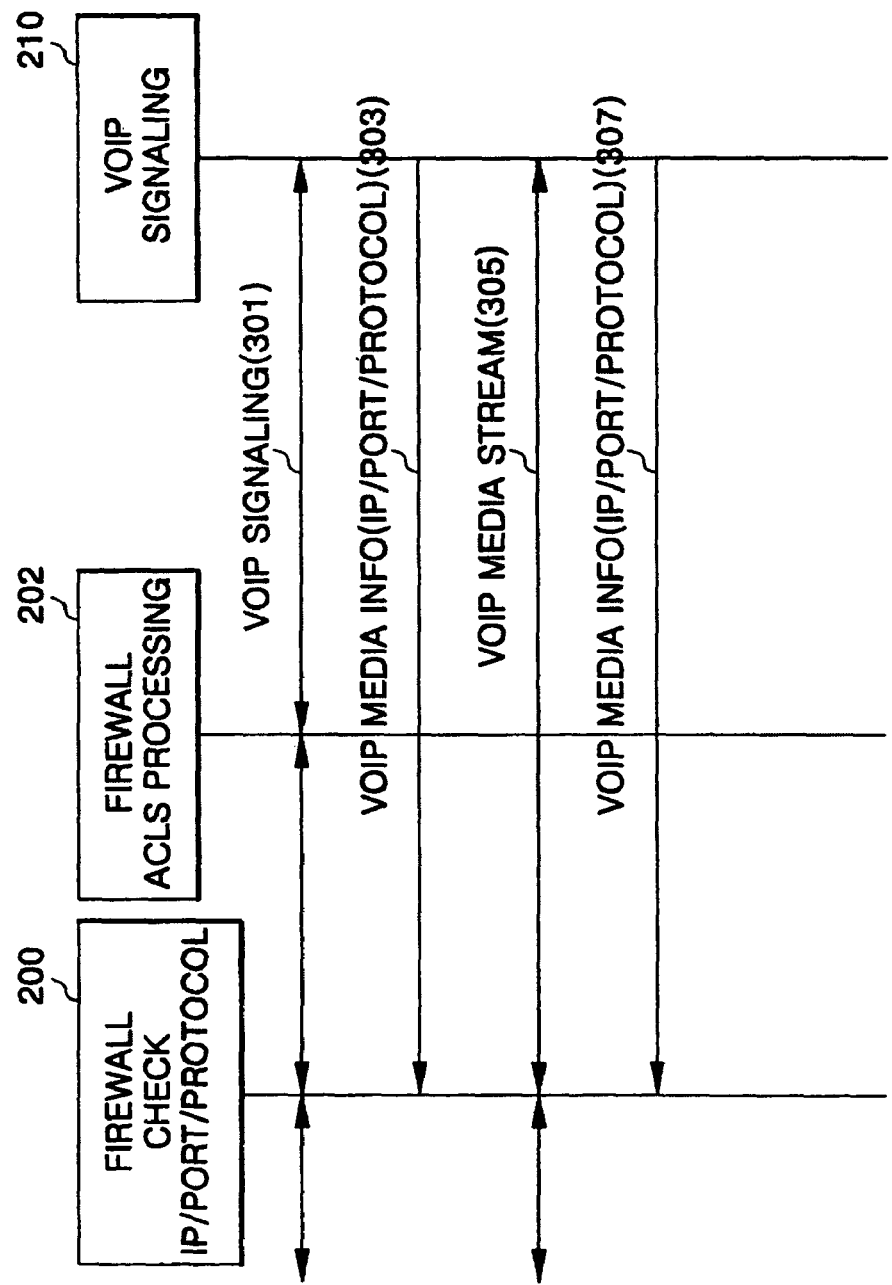

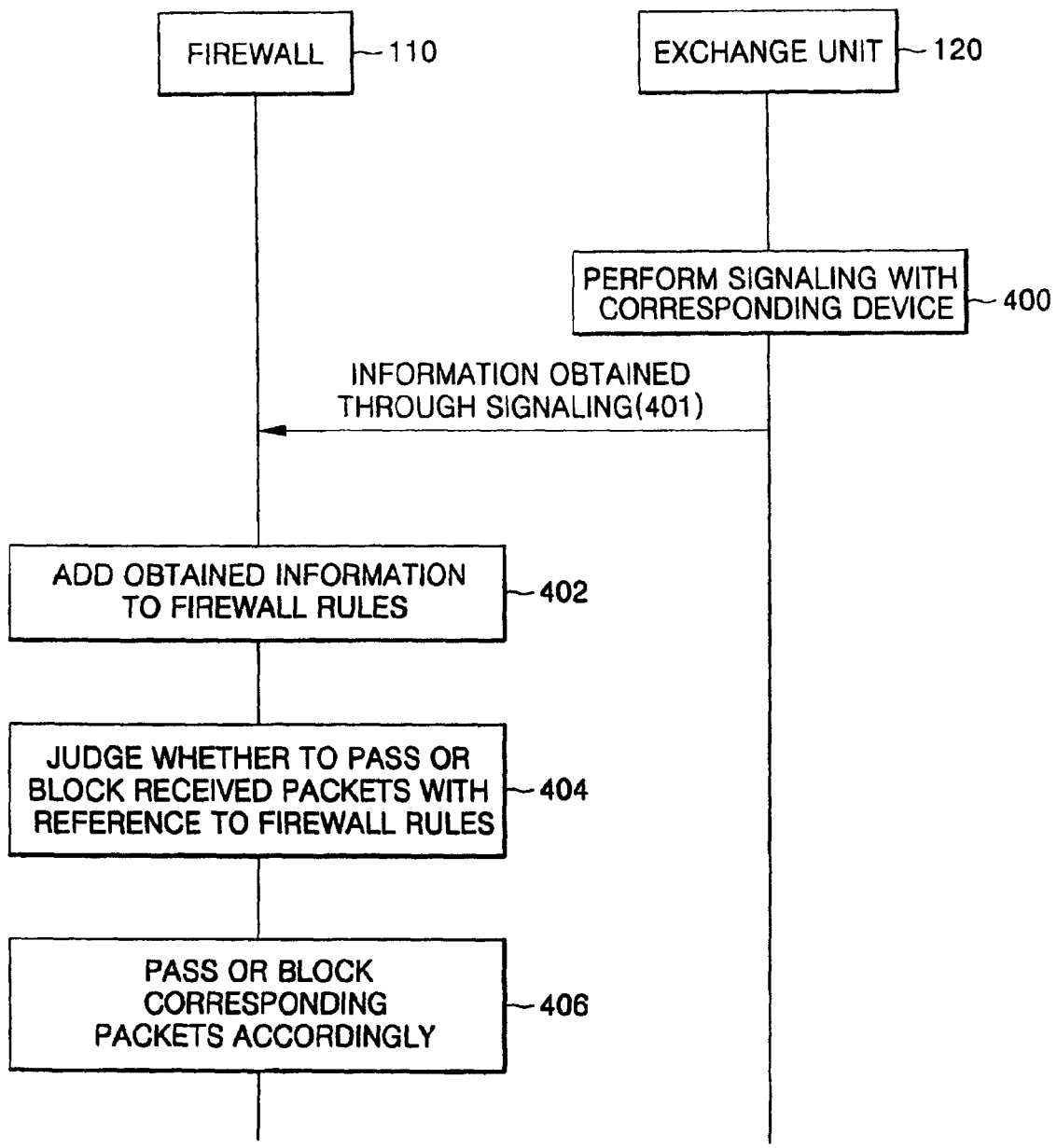

DYNAMIC NETWORK SECURITY

CLAIM OF PRIORITY

This application makes reference to, incorporates the same herein, and claims all benefits accruing under 35 U.S.C. §119 from an application for SYSTEM AND METHOD FOR DYNAMIC NETWORK SECURITY filed in the Korean Intellectual Property Office on May 17, 2005 and there duly assigned Serial No. 10-2005-0041332.

BACKGROUND OF THE INVENTION

1. Field of the Invention

The present invention relates to dynamic network security, and more particularly, to a dynamic network security system and method using a firewall.

2. Description of the Related Art

Security is one of the most important problems in networks at the present time. Various kinds of network security apparatus and methods have been used, and a firewall is one such network security apparatus. The firewall is used to protect against external attacks by being located at a point where its own group and an outside network such as the Internet are connected and allowing only certain services when connecting to the outside network. If the firewall is not used, all hosts within the group are vulnerable to attack from the outside.

There are various schemes for configuring firewalls, and a packet filtering scheme is generally used for firewalls using IP technologies. In the packet filtering scheme, a firewall is configured to pass only certain packets in order to avoid external attack. When packets are received, a firewall using the packet filtering scheme judges whether to pass or block the packets based on information within the packets, such as IP/Port numbers, and then passes or blocks them accordingly.

A firewall stores predetermined firewall rules for judging whether to pass or block received packets and operates based on the firewall rules. If packets are received, the firewall judges whether to pass or block the received packets with reference to the firewall rules, and then passes or blocks the packets accordingly. Therefore, information on which packets are to be passed must be previously registered in the firewall rules. Information such as IPs, port numbers, and protocols can be included in the firewall rules.

Current networks support VoIP (Voice over Internet Protocol) packets, and the amount of packets used in such networks has been increasing day by day. However, VoIP packets use dynamic IPs and ports. In the case of such packets using dynamic IPs and ports, a firewall operates as follows:

If received packets do not use a port that is well-known by the firewall, there is no way for the firewall to judge whether or not dynamic IPs and ports are applied. Thus, the firewall rules must be set to limit a range of IPs and ports for which packets are allowed to pass through the firewall.

Furthermore, a firewall is limited by VoIP services in a network environment where private IPs are used. The VoIP services need an ALG (Application Level Gateway) to use the private IPs and must use public IPs if there is no ALG. As a matter of course, in VoIP services using private IPs or public IPs, corresponding IPs, ports, and the like must previously be open to the firewall.

However, as for packets using dynamic IPs and ports, predetermined IPs and ports are not always applied to firewall rules. As a result, firewalls cannot be configured reliably.

SUMMARY OF THE INVENTION

It is an object of the present invention to provide a dynamic network security system and method using a firewall.

It is another object of the present invention to provide a dynamic network security system and method for VoIP packets.

It is still another object of the present invention to provide a dynamic network security system and method for packets using dynamic IPs and ports.

According to one aspect of the present invention, a system for dynamic network security is provided including: a firewall adapted to store rule information on whether to pass or block externally inputted packets in an Access Control List (ACL), and to pass or block the received packets in accordance with rules stored in the ACL; and an exchange device adapted to transmit information on packets to be passed through the firewall to the firewall.

The exchange device preferably includes a signaling unit adapted to obtain communication information used for communication with a device by signaling with the device, and to transmit the obtained communication information to the firewall.

The signaling unit preferably includes a Voice over Internet Protocol (VoIP) signaling unit adapted to effect VoIP communication with the device.

The communication information preferably includes IP/Port/Protocol information used for communication.

The exchange device is preferably adapted to transmit the obtained communication information to the firewall using a predetermined protocol. The exchange device is preferably adapted to transmit the obtained communication information to the firewall through Inter Processor Communication (IPC). The exchange device is preferably adapted to transmit information for canceling firewall pass rules set for communication with the device to the firewall in response to the communication with the device being terminated.

The firewall preferably further includes a packet processor adapted to block or pass the received packets in accordance with the rules stored in the ACL.

According to another aspect of the present invention, a dynamic network security method for a network including a firewall is provided, the method including: obtaining communication information from a device through signaling with the device; providing the obtained communication information to the firewall; and passing or blocking packets received at the firewall according to the communication information.

The communication information obtained through signaling preferably includes IP/Port/Protocol information.

The signaling preferably includes Voice over Internet Protocol (VoIP) signaling for VoIP communication with the device.

In providing the obtained communication information to the firewall, the communication information is preferably provided to the firewall using a predetermined protocol. The communication information is preferably provided to the firewall by communication among processors. The communication information provided to the firewall is preferably stored in an Access Control List (ACL) of the firewall.

The method further preferably includes recognizing when the communication with a device in which firewall rules are set to pass packets has been terminated through the signaling with the device, and providing the firewall with information for canceling the firewall rules set for communication with the device in response thereto.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings, in which like reference symbols indicate the same or similar components, wherein:

FIG. 3 is a signal flow diagram of the exchange of information in accordance with an embodiment of the present invention; and FIG. 4 is a signal flow diagram of the processes in accordance with an embodiment of a method of the present invention.

DETAILED DESCRIPTION OF INVENTION

Figure 1:
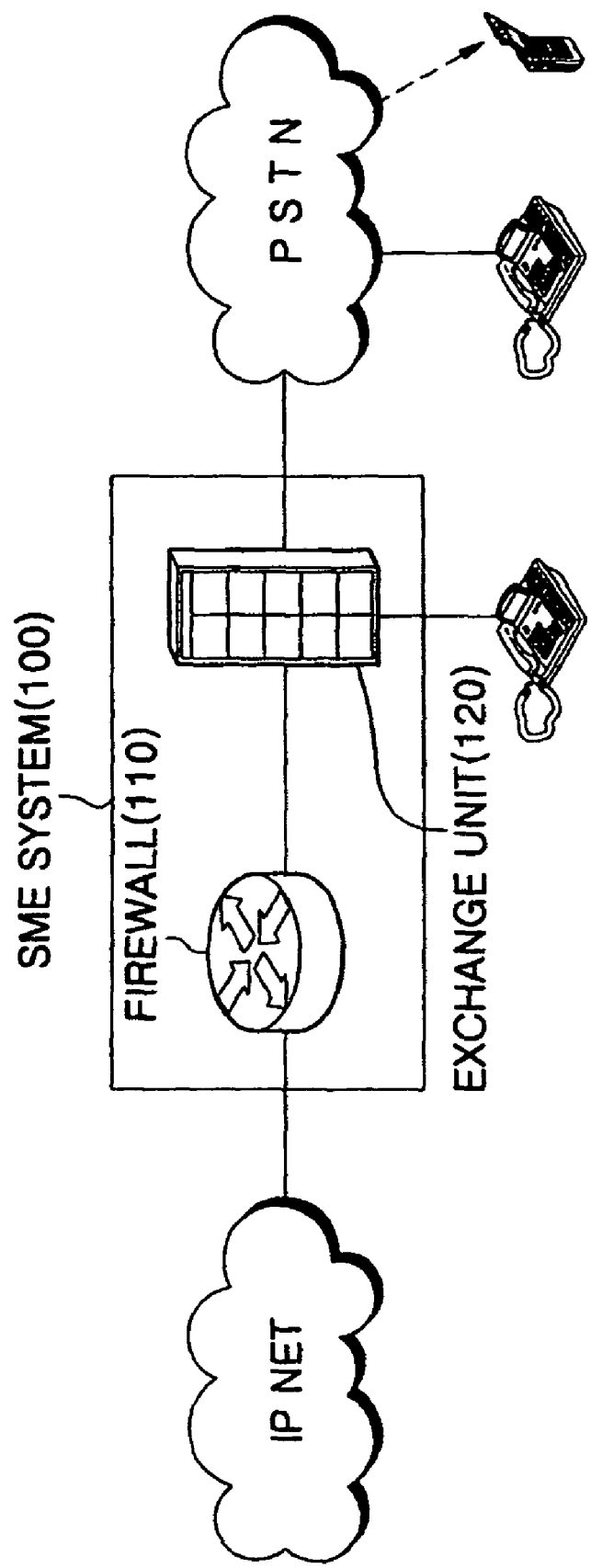
FIG. 1 is a block diagram of a network including an integrated exchange device in which a security device and an exchange device are integrated.

The present invention will now be described more fully with reference to the accompanying drawings, in which exemplary embodiments of the present invention are shown. The present invention can, however, be embodied in different forms and should not be construed as being limited to the exemplary embodiments set forth herein. Rather, these exemplary embodiments are provided so that this disclosure will be thorough and complete, and will fully convey the scope of the present invention to those skilled in the art. In the drawings, whenever the same element reappears in a subsequent drawing, it is denoted by the same reference numeral.

In an all-in-one system in which functions of a firewall and VoIP (Voice over IP) are integrated, VoIP packets are excluded and then differently processed sharing ingress VoIP IP/Port information that can be obtained through VoIP signaling with a firewall system through an internal connection, thereby guaranteeing Security QoS (Quality of Service) of the firewall.

Application of a firewall to dynamic IPs and ports is temporarily excluded only when VoIP service is provided instead of a scheme in which a firewall operator previously specifies and then sets a range of used IPs, ports, and protocol information for existing VoIP packets, thereby overcoming limitations in the firewall setup.

The present invention can be applied both to systems in which firewall and VoIP functions are integrated and to systems in which firewall and VoIP functions are not integrated.

An exemplary embodiment in which the present invention is applied to a system in which firewall and VoIP functions are integrated is described below.

The present invention described below can be implemented using IP/Port information. That is, if the system of the present invention judges that reception of VoIP packets through a specific port has begun, the system doesn't block but passes the packets received through the port thereafter. Then, if the system judges that reception of the VoIP packets through the port has finished, the present invention blocks packets received through the port thereafter.

In the present invention, an exchange device judges whether the received packets are passed or blocked. The exchange device obtains communication information such as IP/Port numbers with which packets can be received through a signaling process for performing communication with a corresponding device, and provides a firewall with the obtained communication information. The firewall judges whether to block or pass packets received using communication information provided from the exchange device.

If the firewall receives communication information from the exchange device, it passes packets received through a port specified in the communication information. As such, the firewall has an ACL (Access Control List) in which information based on judgment of whether to pass or block received packets is stored. In the present invention, the firewall updates the ACL whenever communication information is received from the exchange device. Accordingly, the present invention enables dynamic network security to be implemented by passing and blocking packets with the firewall according to a current communication condition.

That is, in the present invention, a firewall updates the ACL in real time by reflecting communication information that the exchange device obtains and then provides through a signaling process. Furthermore, the firewall judges whether to pass or block received packets with reference to the ACL updated in real time, and passes or blocks the received packets accordingly.

If the exchange device judges that VoIP communication through the port has finished, information including the port information and a signal for instructing the firewall to block packets received through the port is provided thereto. That is, if the reception of VoIP packets through the port permitted by the firewall is completed, the exchange device revokes permission for packets received through the port to pass through the firewall. The exchange device can obtain such information on whether or not communication is finished through a signaling process with corresponding devices performing the communication.

If the firewall receives information on revocation of permission to pass through the firewall from the exchange device, the firewall updates the ACL according to the received information. Then, whether received packets are to be passed or blocked by the firewall is determined in accordance with the updated ACL. Packets received through the port previously permitted to pass by the firewall are thereafter blocked by the firewall due to receipt of the information on revocation of permission to pass through the firewall and consequent updating of the ACL.

Exemplary embodiments of the present invention are described in detail below with reference to the accompanying drawings. Exemplary embodiments of the present invention applied to IP packets for requesting real time processing are described below. More specifically, VoIPs are used as examples of packets requiring real-time processing in the exemplary embodiments below. However, these specific examples are to aid in understanding the present invention, not to limit its scope.

FIG. 1 is a block diagram of a network including an integrated exchange device in which a security device and an exchange device are integrated.

The integrated exchange device (SME system) 100 of FIG. 1 has a security function of judging whether or not received packets are to be blocked and then passing or blocking the received packets accordingly, and an exchange function for passing normal packets. A firewall 110 opens or blocks ports for connecting networks based on predetermined rules, and an exchange unit 120 performs the exchange function for transmitting packets to required locations in accordance with information included in the received packets.

In the present invention, the exchange unit 120 performs signaling with a device required to perform communication and provides the firewall 110 with information obtained through the signaling.

The present invention can be applied to a network including the integrated exchange device 100 of FIG. 1 or to a network in which the firewall 110 and the exchange unit 120 are independent. A first exemplary embodiment capable of being applied to a network including the integrated exchange device of FIG. 1 is described below.

Figure 2:
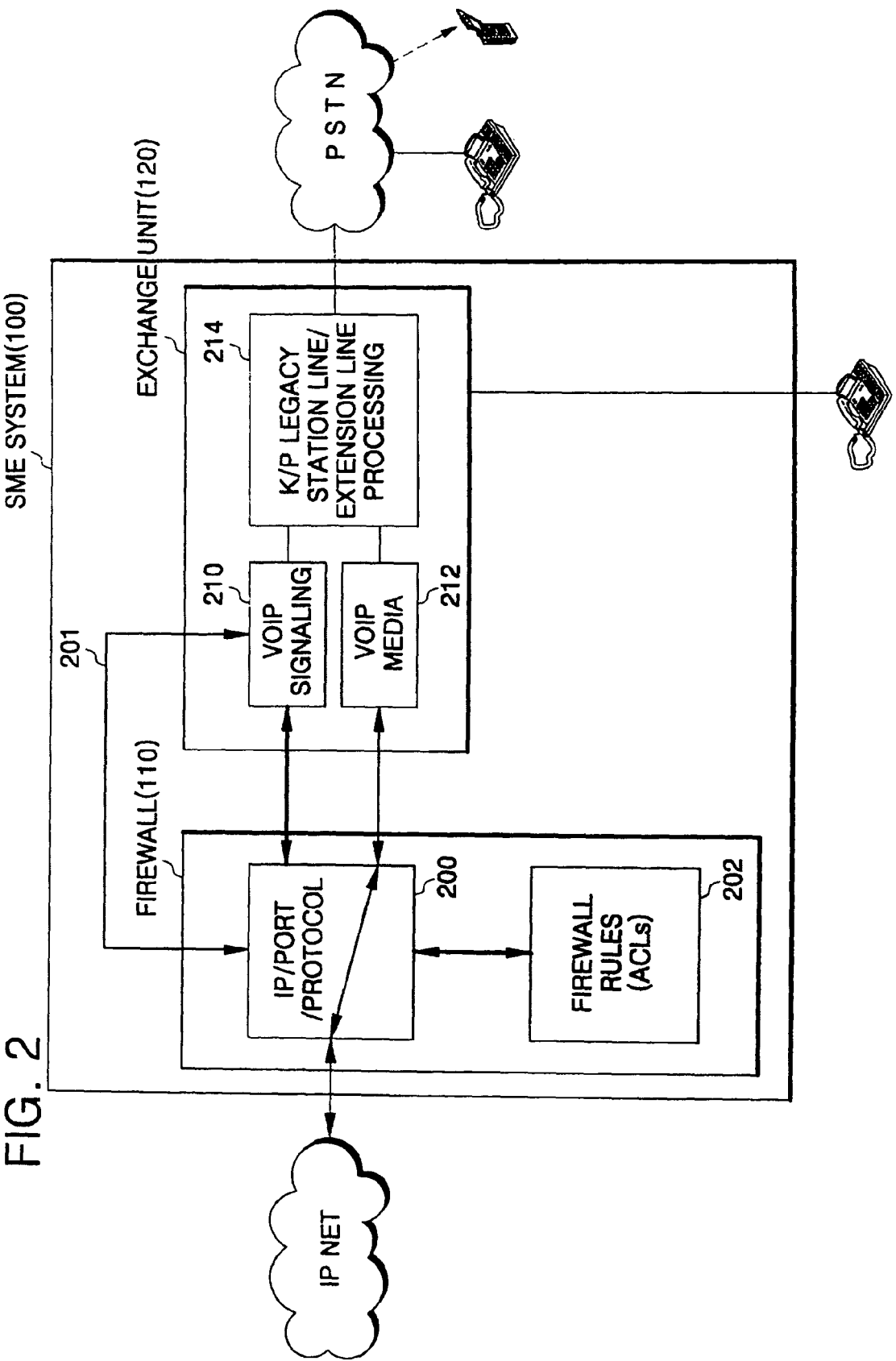
FIG. 2 is a block diagram of a detailed configuration of a firewall and an exchange unit of the integrated exchange device of FIG. 1.

FIG. 2 is a block diagram of a detailed configuration of a firewall and an exchange unit of the integrated exchange device of FIG. 1.

The exchange unit 120 of FIG. 2 performs an exchange function of transmitting each received packet to a required location in accordance with information included in the packet. In the present invention, the exchange unit 120 further includes a function of providing communication information obtained through signaling, such as IP/Port number/Protocol information, to the firewall 110. The exchange unit 120 can include a VoIP signaling processing module 210, a VoIP media processing module 212, and an exchange processing module 214 (K/P Legacy station line/extension line processing).

The VoIP signaling processing module 210 performs signaling processing for a VoIP call. The VoIP signaling processing module 210 can judge the type of a received packet through header information of the packet. The VoIP media processing module 212 performs media transcoding for a VoIP call. The exchange processing module 214 performs an exchange function for each packet.

In the present invention, if it is judged that received packets are VoIP packets requiring real-time processing, the exchange unit 120 provides an IP/Port/Protocol checking module 200 of the firewall 110 with communication information on the packets so that the exchange unit 120 allows the firewall 110 to pass packets received through a corresponding port.

Generally, one call is received through the same port from start to finish. That is, it can be considered that a port through which VoIP packets are received continues to receive VoIP packets until the call including the corresponding packets is finished. Thus, if VoIP packets are received, the exchange unit 120 provides the firewall 110 with IP/Port information for the corresponding VoIP packets so that the exchange unit 120 allows the firewall 110 to pass the packets received through the corresponding port.

Furthermore, when a call judged as a VoIP call has finished, the exchange unit 120 provides the firewall 110 with such information so that the exchange unit 120 revokes permission for packets received through the port to pass through the firewall 110. If the firewall 110 receives information on revocation of permission to pass for a specific port from the exchange unit 120, the firewall 110 blocks packets received through the port thereafter.

That is, the exchange unit 120 provides the firewall 110 with information on whether packets received through an arbitrary port are passed or blocked. Such information that the exchange unit 120 provides to the firewall 110 can include IP information on ports through which VoIP packets are received, port information, protocol information and information on whether to permit or block passage of packets through the firewall 110.

The information can be produced in the VoIP signaling processing module 210 of the exchange unit 120 in particular and provided to the IP/Port/Protocol checking module 200 of the firewall 110. This is because the VoIP signaling processing module 210 can identify VoIP IP/Port information. That is, the VoIP signaling processing module 210 identifies whether or not received packets are VoIP packets requiring real-time processing, and if it is judged that the corresponding packets are VoIP packets, the VoIP signaling processing module 210 provides the IP/Port/Protocol checking module 200 of the firewall 110 with IP/Port information on the packets and information instructing to pass the packets received through the corresponding port. Then, when the final packet of a corresponding call is received, the VoIP signaling processing module 210 provides the IP/Port/Protocol checking module 200 of the firewall 110 with information revoking permission to pass packets received through the corresponding port.

Since the firewall 110 and the exchange unit 120 are parts forming the integrated exchange device 100, the exchange unit 120 can provide the firewall 110 with information instructing the firewall 110 to pass or block VoIP packets using IPC (Inter Processor Communication).

The firewall 110 judges whether to pass or block received packets with reference to the information provided from the exchange unit 120.

The firewall 110 can include an IP/Port/Protocol checking module 200 and a firewall rule storage unit 202. The IP/Port/Protocol checking module 200 judges whether to pass or block received packets, and then passes or blocks the received packets accordingly. The IP/Port/Protocol checking module 200 can judge whether to pass or block received packets with reference to firewall rules stored in the firewall rule storage unit 202, i.e., an ACL. Furthermore, the IP/Port/Protocol checking module 200 receives information on whether to pass or block packets from the VoIP signaling processing module 210 of the exchange unit 120, and outputs the received information to the firewall rule storage unit 202.

The ACL stored in the firewall rule storage unit 202 is updated in real time based on information input from the IP/Port/Protocol checking module 200

In the present invention, the firewall 110 judges whether to pass or block packets received in accordance with the ACL that is updated in real time. Accordingly, the present invention makes dynamic network security feasible, reflecting a current communication condition and using a firewall.

Since a second exemplary embodiment applying the present invention to a network in which a firewall and an exchange device are independent rather than integrated is similar to the aforementioned first exemplary embodiment, a separate description of such a second exemplary embodiment will be omitted. However, unlike the first exemplary embodiment, since the firewall 110 and the exchange device 120 are independent, signal transmission between the exchange device 120 and the firewall 110 cannot be implemented using IPC.

The present invention will now be described with reference to signal flows used therein.

FIG. 3 is a signal flow diagram of the exchange of signals implemented between a firewall and an exchange unit in the network of FIG. 2.

FIG. 3 only shows signal flows among an IP/Port checking module 200 of a firewall 110, a firewall rule storage unit 202, and a VoIP signaling processing module 210 of an exchange unit 120, which are directly related to the present invention.

FIG. 3 includes four-step signal flows. The first signal flow of FIG. 3 is a process for VoIP signaling for a VoIP call. To this end, a signal 301 for VoIP signaling can be used. The VoIP signaling processing module 210 can perform VoIP signaling with a corresponding device for a corresponding call through the IP/Port/Protocol checking module 200 and networks (e.g., IP networks), the signal 301 for VoIP signaling can be used to perform this process. The VoIP signaling processing module 210 starts signaling using a well-know port (e.g., H.323 TCP 1719,1720 Port, SIP UDP 5060 Port). The VoIP signaling processing module 210 can obtain IP/Port information on corresponding packets through VoIP signaling.

The second signal flow of FIG. 3 is a process for instructing the firewall 110 to pass the corresponding packets. If the VoIP signaling processing module 210 of the exchange unit 120 obtains information on whether received packets are passed or blocked through signaling with the corresponding device, the VoIP signaling processing module 210 provides the obtained information to the IP/Port/Protocol checking module 200 of the firewall 110 (303). The information provided to the IP/Port/Protocol checking module 200 is output again to the firewall rule storage unit 202. An ACL stored in the firewall rule storage unit 202 is updated with the information.

The third signal flow of FIG. 3 is a process for transmitting packets passed or blocked at the firewall with reference to the updated ACL (305).

The fourth signal flow of FIG. 3 is a process for revoking permission to pass through the firewall for packets previously permitted to pass through the firewall. When the final packet of a VoIP call has been received, the VoIP signaling processing module 210 transmits to the IP/Port/Protocol checking module 200 of the firewall 110 a VoIP media info (IP/Port/Protocol) signal (307) including IP/Port information on the corresponding packets and information for revoking permission for the corresponding packets to pass through the firewall 110.

The VoIP media info (IP/Port/Protocol) signals 303 and 307 in the second and the third signal flows of FIG. 3 can be transmitted through communication between processors in the aforementioned first exemplary embodiment.

FIG. 4 is a signal flow diagram of processes of a dynamic network security method according to the present invention.

An exchange unit 120 performs signaling with a corresponding device (Step 400). Information obtained through signaling is provided to a firewall 110 (Step 401) which then updates firewall rules using the information received from the exchange unit 120 (Step 402). Then, the firewall 110 judges whether to pass or block packets received with reference to the updated firewall rules (Step 404) and passes or blocks the packets accordingly (Step 406).

As described above, the present invention makes dynamic network security through a firewall feasible by reflecting communication information obtained through signaling with a corresponding device in firewall rules. Furthermore, the present invention makes dynamic network security feasible for packets using dynamic ports, including VoIP (Voice over IP) packets. Accordingly, the present makes network security effective and enhances QoS (Quality of Service) of networks.

While the present invention has been described with reference to exemplary embodiments thereof, it will be understood by those skilled in the art that various modifications in form and detail can be made therein without departing from the spirit and scope of the present invention as defined by the following claims. For example, while VoIP packets have been taken as an example to describe the present invention, the scope of the present invention is not limited to VoIP packets but can be extended to any packets using dynamic IPs and ports.

What is claimed is:

1. A dynamic network security system, comprising:
a firewall to store rule information on whether to pass or block externally inputted packets in an Access Control List (ACL), and to pass or block the received packets in accordance with rules stored in the ACL; and
an exchange device to transmit information on packets to be passed through the firewall to the firewall,
wherein the exchange device comprises a signaling unit to obtain communication information used for communication with a device by signaling with the device, and to transmit the obtained communication information to the firewall,
wherein the exchange device is configured to transmit information for canceling firewall pass rules set for communication with the device to the firewall in response to the communication with the device being terminated.

2. The system according to claim 1, wherein the signaling unit comprises a Voice over Internet Protocol (VoIP) signaling unit to effect VoIP communication with the device.

3. The system according to claim 1, wherein the communication information comprises IP/Port/Protocol information used for communication.

4. The system according to claim 1, wherein the exchange device is configured to transmit the obtained communication information to the firewall using a predetermined protocol.

5. The system according to claim 1, wherein the exchange device is configured to transmit the obtained communication information to the firewall through Inter Processor Communication (IPC).

6. The system according to claim 1, wherein the firewall further comprises a packet processor to block or pass the received packets in accordance with the rules stored in the ACL.

7. A dynamic network security method for a network comprising a firewall, the method comprising:
obtaining communication information comprising IP/Port/Protocol information from a device through signaling with the device;
providing the obtained communication information to the firewall;
passing or blocking packets received at the firewall according to the communication information; and
recognizing when the communication with a device in which firewall rules are set to pass packets has been terminated through the signaling with the device, and providing the firewall with information for canceling the firewall rules set for communication with the device in response thereto.

8. The method according to claim 7, wherein the signaling comprises Voice over Internet Protocol (VoIP) signaling for VoIP communication with the device.

9. The method according to claim 7, wherein, in providing the obtained communication information to the firewall, the communication information is provided to the firewall using a predetermined protocol.

10. The method according to claim 7, wherein the communication information is provided to the firewall by communication among processors.

11. The method according to claim 7, wherein the communication information provided to the firewall is stored in an Access Control List (ACL) of the firewall.

12. A dynamic network security method for a network comprising a firewall, the method comprising:
obtaining communication information from a device through signaling with the device, the communication information being provided to the firewall and stored in an Access Control List (ACL) of the firewall;
passing or blocking packets received at the firewall according to the communication information; and
recognizing when communication with a device to which firewall rules are set to pass packets has been terminated through the signaling with the device, and providing the firewall with information for canceling the firewall rules set for communication with the device in response thereto.

13. The method according to claim 12, wherein the communication information obtained through signaling comprises IP/Port/Protocol information.

14. The method according to claim 12, wherein the signaling comprises Voice over Internet Protocol (VoIP) signaling for VoIP communication with the device.

15. The method according to claim 12, wherein, in providing the obtained communication information to the firewall, the communication information is provided to the firewall using a predetermined protocol.

* * * * *